Patented Apr. 14, 1931

1,800,887

UNITED STATES PATENT OFFICE

JULIUS HYMAN AND ARTHUR F. SCHLANDT, OF CHICAGO, ILLINOIS, ASSIGNORS TO THE PURE OIL COMPANY, OF CHICAGO, ILLINOIS, A CORPORATION OF OHIO

PROCESS FOR BREAKING PETROLEUM EMULSIONS

No Drawing.   Application filed March 26, 1929.  Serial No. 350,126.

This invention relates to an improved process for breaking petroleum emulsions for the purpose of separating effectively and economically the oil content of the emulsion and to render such oil suitable for commercial purposes. Petroleum emulsions of the character referred to are frequently found in the crude oils pumped from wells and, again, the emulsions are found in the bottoms of oil storage tanks or in other receptacles in which crude oil especially is allowed to stand. These emulsions contain varying amounts of oil, water or brine and other foreign matter and are of a relatively stable character, being difficult to break down and separate into component parts in an economical and practical manner. The emulsions are known in the industry by a variety of names and are frequently referred to as cut oil, roily oil, basic sediment, bottom settlings, sludge and B. S.

It is a principal object of the present invention to treat petroleum emulsions of this type in an effective manner whereby to destroy the permanency or stability of the emulsion and cause it to break or separate promptly in order to yield separate strata of oil and water or other foreign substances, whereby the oil may be separately collected and removed and placed to various commercial uses.

The present invention is based largely on the hypothesis that pure water droplets immersed in pure oil carry positive charges, the oil carrying the negative charge. If the oil be free of oil-soluble acid bodies such as might combine with alkaline earth ions to form insoluble compounds, then droplets of acidified water suspended in the oil will, according to our hypothesis, carry smaller positive charges than do pure water droplets of the same size, whereas droplets of basic water will carry larger positive charges.

Certain investigators have found, however, that water droplets suspended in crude petroleum oils in the form of oil-field emulsions migrate, under the influence of a strong electrical field, either to the positive or negative pole of said field. They have determined, furthermore, that when the water is acid the droplets migrate toward the negative pole, while when the water is alkaline the droplets migrate toward the positive pole.

In order to harmonize our hypothesis with the results of investigation previously stated, we further assume that the crude petroleum in oil-field emulsions contains acid bodies which are capable of combining with alkaline earth ions to form insoluble compounds. Such an assumption has considerable experimental basis, and represents in part the present-day attitude toward oil-field emulsions. Acid bodies of the type designated are grouped together under the name "naphthenic acids". Water-insoluble organic acid salts are said to be negatively charged in collodial condition, and are lyophobic in character—that is, they tend to flocculate or otherwise precipitate from aqueous solutions. When soap is placed in "hard" water, the scum which is formed is a good example of a water-insoluble organic acid salt. Because of the comparative low acidity of the naphthenic acids, their water-insoluble salts cannot exist in contact with fairly strong acid waters. Hence, such acid waters in emulsion form will carry their natural—positive—charge (even though not so pronouncedly as would neutral waters), and in an electric field will migrate toward the negative pole. If the water in oil-field emulsions is alkaline, however, the water droplets are covered with an insoluble scum of naphthenic acid metallic salts, bearing the opposite charge to that of the alkaline water. The result is that the system "alkaline water and scum" carries a capillary negative charge, and moves toward the positive pole in an electrical field—exactly the opposite of what the alkaline water alone would do.

The purpose of the present invention then is, first, to dissolve or otherwise remove the water-insoluble naphthenic acid salts—should these be present—surrounding the water droplets; and, second, to neutralize the positive charges on the water droplets themselves by the addition of lyophilic colloids—that is, colloids which tend to persist in suspension in aqueous solutions—bearing electro-negative capillary charges.

The first of these steps may be carried out in a variety of ways, as for example, by the addition of inorganic acids, which liberate the naphthenic acids from their salts; or by the addition of alkali metal salts of organic acids capable of forming soluble compounds with calcium and magnesium, in which instance the lyophilic naphthenic acid salts of the alkalis are formed by double decomposition. For instance, the calcium and magnesium salts of many sulfonated fatty and naphthenic acids do not form a scum in water, but appear to be soluble. They are in reality lyophilic colloids. Hence, if a sodium salt of a sulphonated fatty or naphthenic acid is added to the lyophobic calcium or magnesium naphthenate, there will be formed by double decomposition, say, calcium sulfo-naphthenate and sodium naphthenate, both of which are lyophilic.

The second step is more difficult, in view of the fact that comparatively few of the lyophilic negative colloids are oil-soluble. As oil-field emulsions are all of the water-in-oil type, the water is the disperse phase, the oil the continuous phase. Hence, to reach the water, the colloid must first traverse the intervening oil.

We have found that it is possible to combine both steps described previously by allowing the lyophilic negative colloids to be formed directly in the body of the emulsion, preferably within or at the surface of the water droplets, where at least one of the reacting substances or at least one of the reaction products is an acid.

Examples follow:

Sulfur dioxide and hydrogen sulfide react to give sulfur and water. Sulfur thus formed is a lyophilic negative colloid, the sulfur dioxide being the acid. In an actual test, a very tenacious oil-field emulsion containing between 40 and 50% of B. S. & W. was treated for about one minute with sulfur dioxide, by allowing the sulfur dioxide gas to bubble through the emulsion inclosed in a container. Thereupon the emulsion and gas were agitated vigorously by shaking, after which the emulsion was again similarly treated with hydrogen sulfide gas and received a similar shaking. An action became apparent immediately, and after the container and its contents had been heated to 130° F. for approximately 90 minutes the separation of oil from water and scum was practically completed.

When sulfur chloride is mixed with water, sulfur and hydrogen chloride are among the products formed. Here, too, some of the sulfur formed acts as a lyophilic negative colloid, the hydrogen chloride being the acid. In an actual test, the equivalent amount of two pounds sulfur chloride per hundred barrels emulsion was mixed with a very stable emulsion containing about 5% B. S. & W. (We have found it advantageous at times to dilute the sulfur chloride by mixing it with an inert petroleum fraction or crude.) In 24 hours there had been practically a complete separation of water from oil, the temperature having been held at 145° F. A blank under the same conditions still showed almost 4% of water remaining in the oil.

Similarly, silicon tetrachloride, which reacts with the water to give silicon dioxide (a lyophilic negative colloid) and hydrogen chloride, has been found effective in breaking certain emulsions.

Also, sulfur dioxide alone and hydrogen sulfide alone are able to break some emulsions. We ascribe this action not only to the acid properties of these gases, but to the probability that they react with certain constituents of emulsions to produce colloidal sulfur.

Chlorine gas is efficacious in breaking certain emulsions. We believe that the hypochlorous acid formed by the action of chlorine on water attacks certain of the sulfur compounds present in the emulsion to give colloidal sulfur and hydrochloric acid, and that the action is not wholly due to the acid present.

However, we find that oil-soluble inorganic acids, such as sulfur dioxide and hydrogen chloride, may in some cases bring an emulsion to a form where heat alone will cause it to break. We find, in general, that small quantities of such strong oil-soluble inorganic acids as hydrogen chloride tend to separate the water droplets and scum together from the body of oil in an oil-field emulsion, leaving the supernatant oil quite clear.

It will be understood that the amounts of reagents employed in relation to the quantity of oil treated is determined largely by the specific character of the emulsion undergoing treatment. In general, however, we find it advantageous to use reagents which react with the water in the emulsions only when the water content is comparatively low, this limit being determined by the treating costs.

What is claimed is:

1. A process for breaking petroleum emulsions, which consists in introducing into such an emulsion acid anhydrades in the form of sulphur dioxide and hydrogen sulfide which react directly in the body of the emulsion to form lyophilic negative colloids.

2. A process for breaking petroleum emulsions, which consists in introducing into such an emulsion acid anhydrades in the form of surphur dioxide and hydrogen sulfide which react directly in the body of the emulsion to form lyophilic negative colloids, and then heating the emulsion and allowing it to stand until the separation of the oil and the water-like constituents thereof takes place.

3. A process for breaking oil and water petroleum emulsions, which consists in introducing into such an emulsion two or more gases which react in the emulsion to form an acid and lyophilic negative colloids, the acid liberated serving to remove or dissolve the water-insoluble naphthenic acid salts surrounding the water droplets contained in the emulsion to remove the negative colloids to contact directly with the water-droplets to neutralize the positive charge on such droplets, and subsequently removing the oil from the separated water.

4. A process for breaking petroleum emulsions, which consists in permeating such an emulsion with sulphur dioxide and in subsequently thoroughly permeating the emulsion with hydrogen sulfide whereby to develop directly in said emulsions by the interaction of said gases acids and lyophilic negative colloids.

5. The method of breaking oil and water petroleum emulsions wherein the water droplets in such an emulsion are in the dispersed phase and encased in water insoluble naphthenic acid salts, the oil of the emulsion being in the continuous phase, which consists in releasing within such an emulsion by the addition of extraneous compounds thereto an inorganic acid capable of removing or dissolving the covering of water insoluble naphthenic acid salts surrounding the positively charged water droplets and developing and thereby bringing into direct contact with such droplets lyophilic colloids bearing a negative charge capable of neutralizing the positive charge on the water droplets.

6. The method of breaking oil and water petroleum emulsions wherein the water droplets in such an emulsion are in the dispersed phase and encased in water insoluble naphthenic acid salts, the oil of the emulsion being in the continuous phase, which consists in releasing within such an emulsion by the addition of extraneous compounds thereto an inorganic acid capable of removing or dissolving the covering of water insoluble naphthenic acid salts surrounding the positively charged water droplets and developing and thereby bringing into direct contact with such droplets lyophilic colloids bearing a negative charge capable of neutralizing the positive charge on the water droplets, and permitting the emulsion to stand until the complete separation of the water from the oil constituents thereof is effected.

7. The method of breaking oil and water petroleum emulsions wherein the water droplets in such an emulsion are in the dispersed phase and encased in water insoluble naphthenic acid salts, the oil of the emulsion being in the continuous phase, which consists in releasing within such an emulsion by the addition of extraneous compounds thereto an inorganic acid capable of removing or dissolving the covering of water insoluble naphthenic acid salts surrounding the positively charged water droplets and developing and thereby bringing into direct contact with such droplets lyophilic colloids bearing a negative charge capable of neutralizing the positive charge on the water droplets, and then heating the emulsion to expedite the complete separation of the water and oil constituents thereof.

In testimony whereof we affix our signatures.

JULIUS HYMAN.
ARTHUR F. SCHLANDT.